United States Patent [19]

Nakahara et al.

[11] Patent Number: 5,054,240
[45] Date of Patent: Oct. 8, 1991

[54] END MEMBER FOR SEALING OPEN END OF VEHICLE WEATHERSTRIP

[75] Inventors: Hisao Nakahara; Hiroshi Sakuma; Noriaki Eto; Shinichiro Nagase, all of Chiba, Japan

[73] Assignee: Kinugawa Rubber Industrial Co., Ltd., Chiba, Japan

[21] Appl. No.: 515,624

[22] Filed: Apr. 27, 1990

[30] Foreign Application Priority Data

Apr. 28, 1989 [JP] Japan .................. 1-109479

[51] Int. Cl.$^5$ .............................. E06B 7/16
[52] U.S. Cl. ...................... 49/476; 49/491
[58] Field of Search ............ 49/476, 485, 486, 488, 49/490, 491, 493

[56] References Cited

U.S. PATENT DOCUMENTS

| | | | |
|---|---|---|---|
| 3,742,649 | 7/1973 | Dochnahl | 49/491 X |
| 4,255,902 | 3/1981 | Ruff | 49/488 |
| 4,494,790 | 1/1985 | Omura | 49/476 X |
| 4,553,336 | 11/1985 | Ralph | 49/476 X |

FOREIGN PATENT DOCUMENTS

| | | |
|---|---|---|
| 1005852 | 4/1957 | Fed. Rep. of Germany . |
| 2018864 | 11/1971 | Fed. Rep. of Germany . |
| 3822050 | 1/1989 | Fed. Rep. of Germany . |
| 2558517 | 1/1984 | France .................. 49/476 |

Primary Examiner—Rodney M. Lindsey
Assistant Examiner—Jerry Redman
Attorney, Agent, or Firm—Bachman & Lapointe

[57] ABSTRACT

An end member is provided which seals an open end of a weatherstrip bordering an edge of a vehicle. This end member includes a fastening portion for elastically holding a portion of the edge of the vehicle which is covered by the weatherstrip to retain the end member to the open end of the weatherstrip and a sealing portion for blocking the open end of the weatherstrip. Thus, the end member is securely fastened to the vehicle and seals the open end of the weatherstrip appropriately.

21 Claims, 8 Drawing Sheets

END MEMBER FOR SEALING OPEN END OF VEHICLE WEATHERSTRIP

BACKGROUND OF THE INVENTION

1. Technical Field

The present invention relates generally to an end member which seals an open end of a weatherstrip for a vehicle. More particularly, the invention relates to an end member which clips to an edge of a vehicle on which a weatherstrip is provided to seal an open end of the weatherstrip in a secure manner so as not to become easily dislodged.

2. Background Art

A structural design of a vehicle door is well known in the art wherein a front edge of a door sash is folded inwardly so as to abut a side of a front pillar with a certain gap therebetween while maintaining a smooth exterior surface between the front edge of the door sash and the front pillar to enhance aerodynamic properties and present a fine appearance. In order to seal the gap between the door sash and the front pillar, a weatherstrip is installed on a drip channel which is attached to the side of the front pillar so that a seal lip of the weatherstrip elastically contacts with an inner wall of the door sash when the door is closed with another weatherstrip disposed within the gap to provide a double seal.

Typically, the lower end of the weatherstrip installed on the drip channel is finished by die forming or insertion of an end cap to enhance appearance when the door is opened. For die forming, it is known in the art to flatten an open end of the weatherstrip by pressing it. In the case of an end cap, a rubber cap is inserted into an open end of the weatherstrip to seal it. Alternatively, a resin material may be injected into the open end to seal it.

However, die forming of an open end seal requires an additional process die forming process, thus increasing manufacturing costs. An end cap inserted into the open end of the weather strip tends to be dislodged due to stress concentrated at the open end due to lack of sufficient gripping force to retain it in position.

SUMMARY OF THE INVENTION

It is accordingly one object of the present invention to avoid the disadvantages of the prior art.

It is another object of the invention to provide an end member which seals an open end of a weatherstrip and won't fall out therefrom easily.

According to one aspect of the present invention, there is provided an end member for sealing an open end of a weatherstrip which borders an edge of a vehicular structural component which comprises a sealing portion for sealing the open end of the weatherstrip, and a fastening portion for elastically holding a portion of the edge of the vehicular structural component which is covered by the weatherstrip to fasten the sealing portion at the open end of the weatherstrip.

According to another aspect of the invention, there is provided an end member for sealing an open end of a weatherstrip which borders a drip channel installed on a vehicle opening which comprises a sealing portion for blocking the open end of the weatherstrip and a fastening portion for elastically holding a portion of the drip channel of the vehicle which is covered by the weatherstrip in cooperation with said sealing portion to retain the end member at the open end of the weatherstrip.

According to a further aspect of the invention, there is provided a weatherstrip for bordering an edge of a vehicle opening which comprises a hollow strip portion contoured for covering the edge of the vehicle opening and an end member for sealing an open end of the strip portion including a sealing portion for sealing the open end of the weatherstrip and a fastening portion for elastically holding a portion of the edge of the vehicle opening which is covered by the weatherstrip to fasten the sealing portion at the open end of the weatherstrip.

BRIEF DESCRIPTION OF THE DRAWINGS

The present invention will be understood from the detailed description given hereinbelow and from the accompanying drawings of the preferred embodiments which are given for explanation and understanding only and are not intended to imply limitation to the invention.

DESCRIPTION OF THE PREFERRED EMBODIMENT

Figure 1:
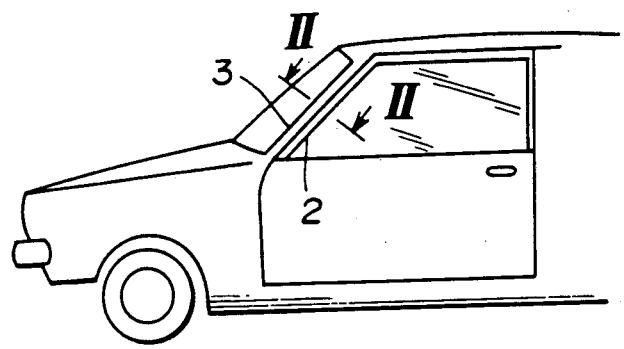
FIG. 1 is a side view which shows a mounting position of a weatherstrip on an automotive vehicle according to the present invention.
Figure 2:
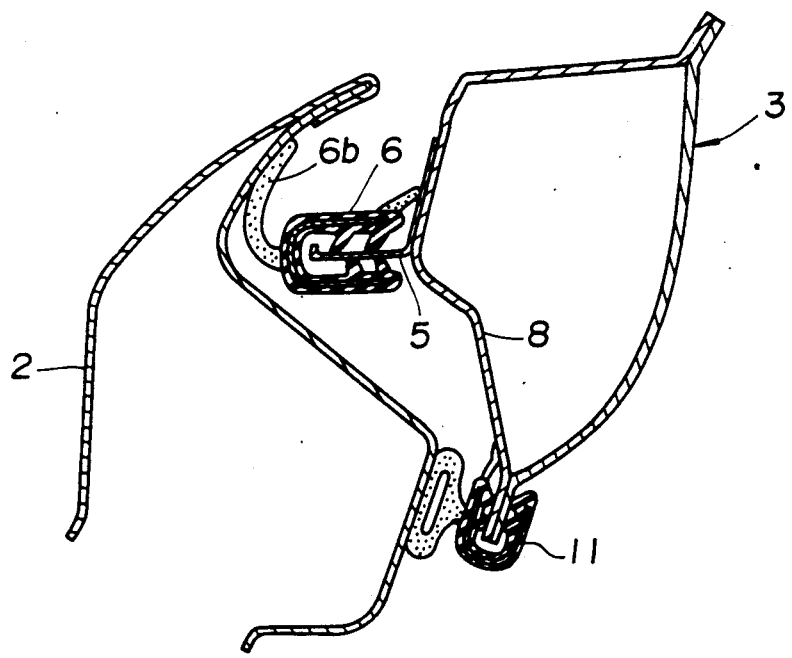
FIG. 2 is a cross-sectional view which shows a weatherstrip, according to the invention, mounted between a door sash and a front pillar of a vehicle together with another weatherstrip.
Figure 3:
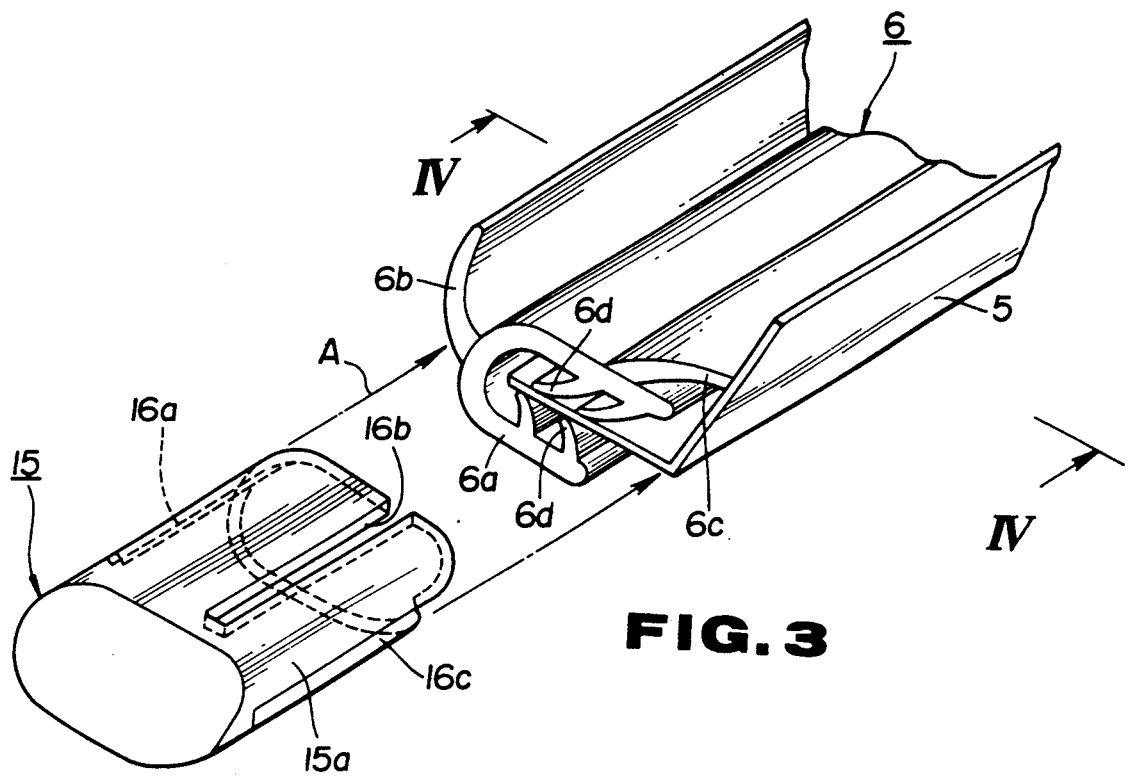
FIG. 3 is a first embodiment of an end member for sealing an open end of a weatherstrip.

Referring now to the drawings, particularly to FIGS. 1 to 3, wherein like numbers refer to like parts throughout several views, an end member, for sealing an open end of a weatherstrip, according to the present invention is shown. The weatherstrip 6, as shown in FIG. 2, borders an edge of a drip channel 5 which is attached to an outer wall 8 of a front pillar 3 to seal elastically between a door sash 2 and the front pillar together with another weatherstrip 11.

The weatherstrip 6 is formed with a U-shaped welt portion 6a, curved seal lips 6b and 6c extending outwardly from the welt portion, a plurality of inner lips 6d integrally formed on inner surfaces of side walls of the welt portion. The seal lip 6b elastically contacts inner panel of the door sash 2 of a closed door, the seal lip 6c elastically contacts a bonding section of the drip channel 5 attached to the front pillar 3, and the inner lip 6d engages with the drip channel 5.

The end member 15 takes the form of a cap. This end cap 15 is made of an elastically deformable synthetic resin and includes slits 16a, 16b, and 16c formed with a clip portion 15a thereof for receiving the seal lips 6b and 6c and drip channel 5 when being installed on an end of the weatherstrip. The cross sectional area of a hollow portion of the end cap 15 is slightly smaller than the size of the welt portion 6a of the weatherstrip 6 in cross section thereof and thus fitting of the end cap to the weatherstrip causes the end portion of the weatherstrip to be pressed against the drip channel with slightly elastic deformation of a portion of the weatherstrip covered by the end cap to fasten the portion to the drip channel. Provision of the slits 16a, 16b, and 16c enhance elastic force provided by the clip portion 15a to retain the weatherstrip on the drip channel in cooperation with the elastic deformation of the weatherstrip, while also preventing the end cap from becoming dislodged from the end portion of the weatherstrip.

Figure 4:
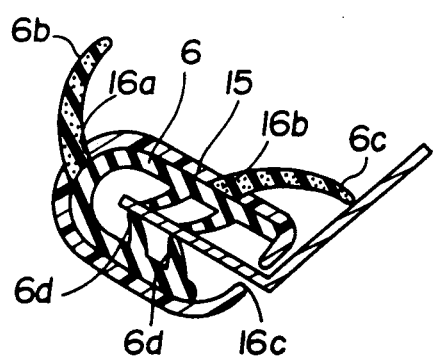
FIG. 4 is a cross-sectional view which shows an end member inserted into an open end of a weatherstrip installed on a drip channel of a front pillar.

FIG. 4 is a cross-sectional view which shows the end cap 15 installed on the weatherstrip 6.

With this arrangement, end sealing of the weatherstrip 6 is easily carried out by inserting the end cap 15 in a direction indicated by an arrow A in FIG. 3, without reducing the sealing effect provided by the seal lips 6b and 6c.

Figure 5:
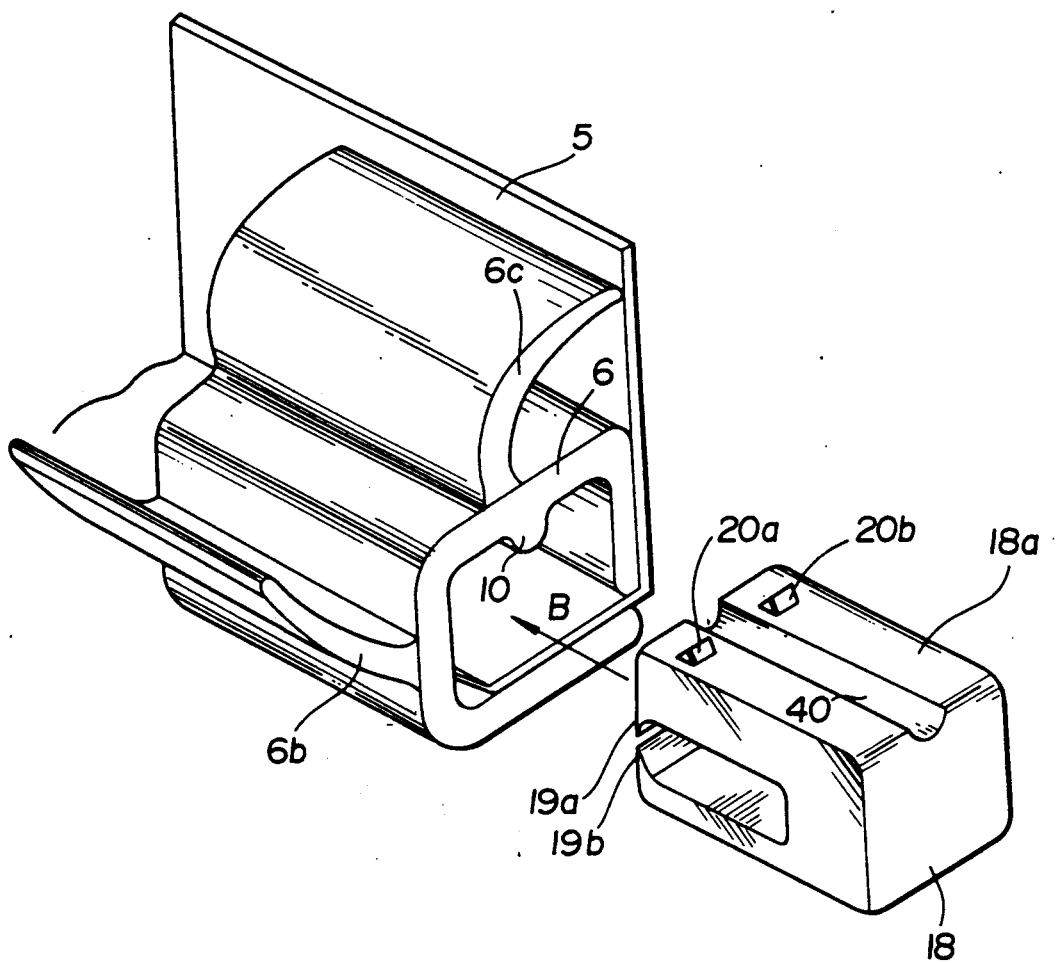
FIGS. 5 to 9 are perspective views which show variations of an end member, according to the invention, for sealing an open end of a weatherstrip.

Referring to FIG. 5, a second embodiment according to the invention is shown. A weatherstrip 6 has a protrusion 10 formed on an inside upper wall and no inner lips are provided. An end member 18 is in the form of a C-shaped clip and includes tapered lips 19a and 19b on two distal portions thereof, a pair of protrusions 20a and 20b on an upper front section thereof, and a groove 40 for receiving the protrusion 10 of the weatherstrip. The weatherstrip 6 borders a drip channel 5 so that a bottom plate of the drip channel engages a lower portion of the weatherstrip.

With this arrangement, insertion of the end clip 18 into an open end of the weatherstrip 6 in a direction indicated by an arrow B causes the upper lip 19a to tightly grip the drip channel 5 and the lower lip 19b to tightly grip the bottom of the weatherstrip; this, together with engagement of the protrusions of 20a and 20b with a surface of the inside upper wall of the weatherstrip, securely fastens the weatherstrip to the drip channel 5 sealing the open end of the weatherstrip and preventing the end clip from becoming dislodged.

Figure 6:
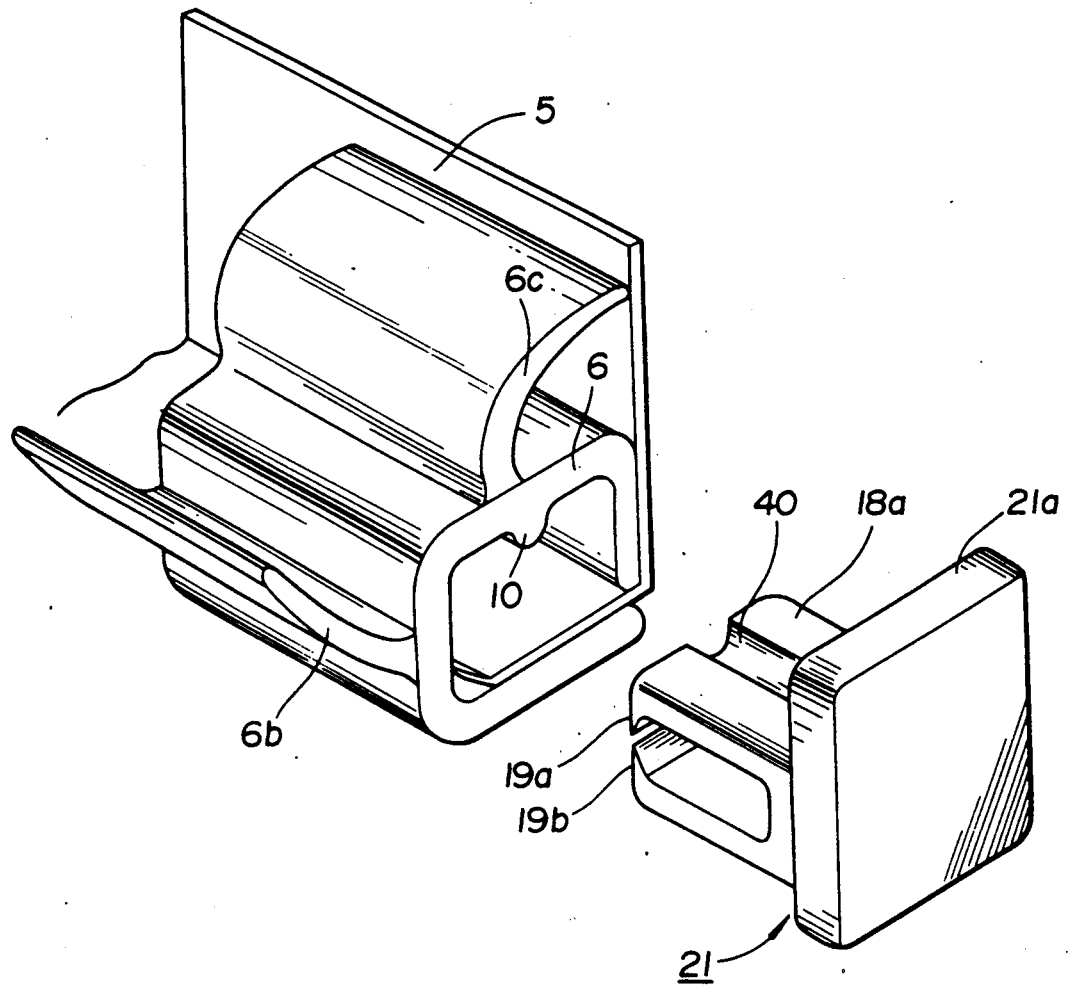

Referring to FIG. 6, a third embodiment according to the invention is shown. An end member 21 includes a clip portion 18a similar to the above second embodiment, lips 19a and 19b are provided on both distal portions thereof, a groove 40 for receiving a protrusion 10 of the weatherstrip, and a head portion 21a.

With this arrangement, insertion of the end clip 21 into an open end of the weatherstrip 6 in a direction indicated by an arrow B until the head portion contacts a peripheral edge of the open end causes the lips 19a and 19b to hold the drip channel 5 and the bottom of the weatherstrip to seal the open end of the weatherstrip via the head portion 21a, preventing foreign matter such as water from being introduced thereinto.

Figure 7:
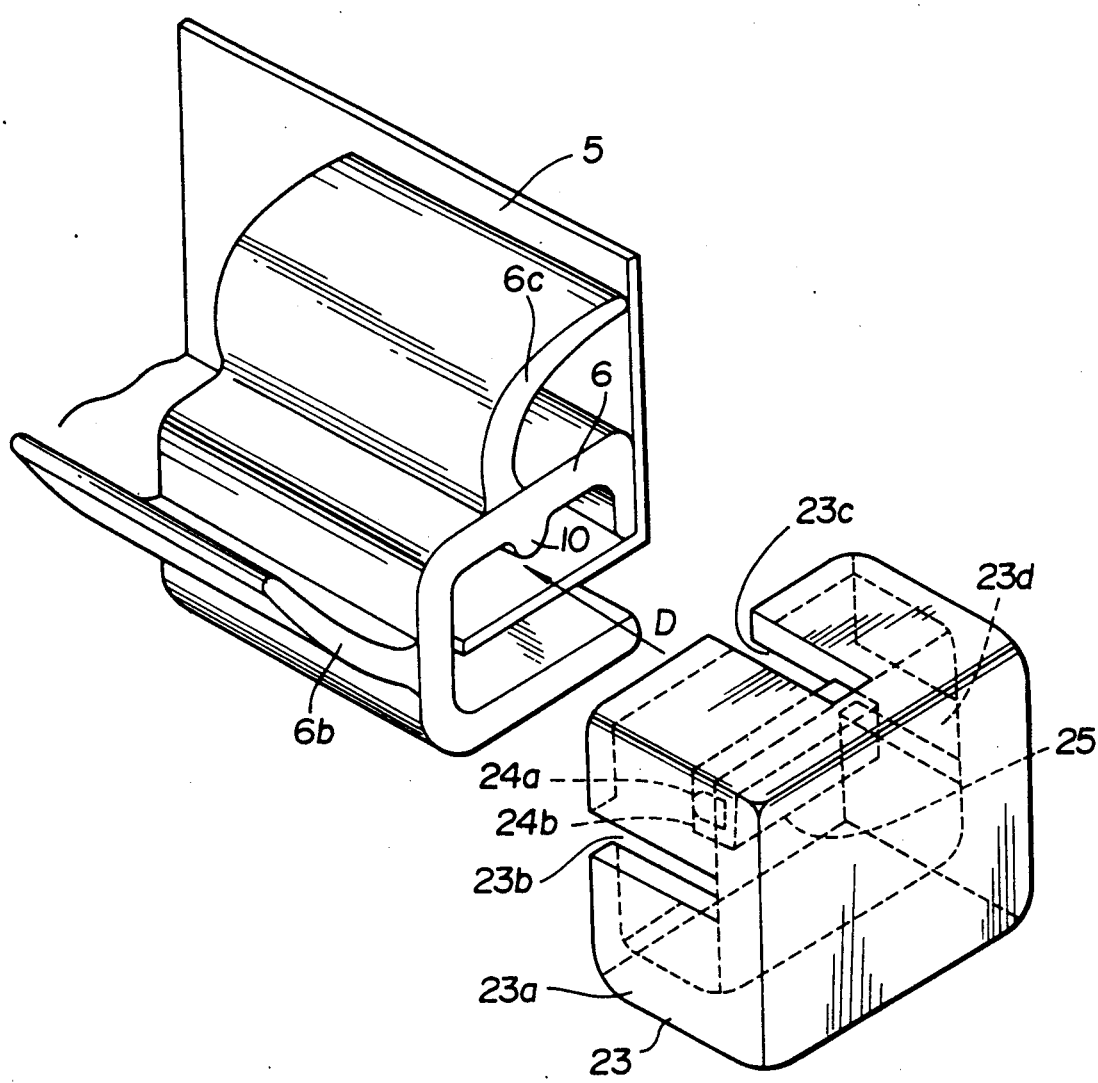

Referring to FIG. 7, a fourth embodiment is shown. An end member 23 takes the form of a cap and includes slits 23b, 23c, 23d in a peripheral portion and clip portion 23a thereof for receiving seal lips 6b and 6c of a weatherstrip 6 and a drip channel 5 and a C-shaped clip portion 25 which has a configuration similar to the above third embodiment for clipping to a portion of the drip channel inserted into the weatherstrip. The clip portion 25 is integrally formed on an end wall of a hollow of the end cap 23 and includes tapered lips 24a and 24b for tightly holding a drip channel 5. The drip channel is inserted into a hollow in the middle portion of the weatherstrip.

With this arrangement, insertion of the end cap 23 into an open end of the weatherstrip 6 in a direction indicated by an arrow D causes the lips 24a and 24b to hold the drip channel 5 and seal lips 6b and 6c and the drip channel 5 to respectively engage slits 23b, 23c, and 23d, achieving hermetic sealing of the open end of the weatherstrip.

Figure 8:
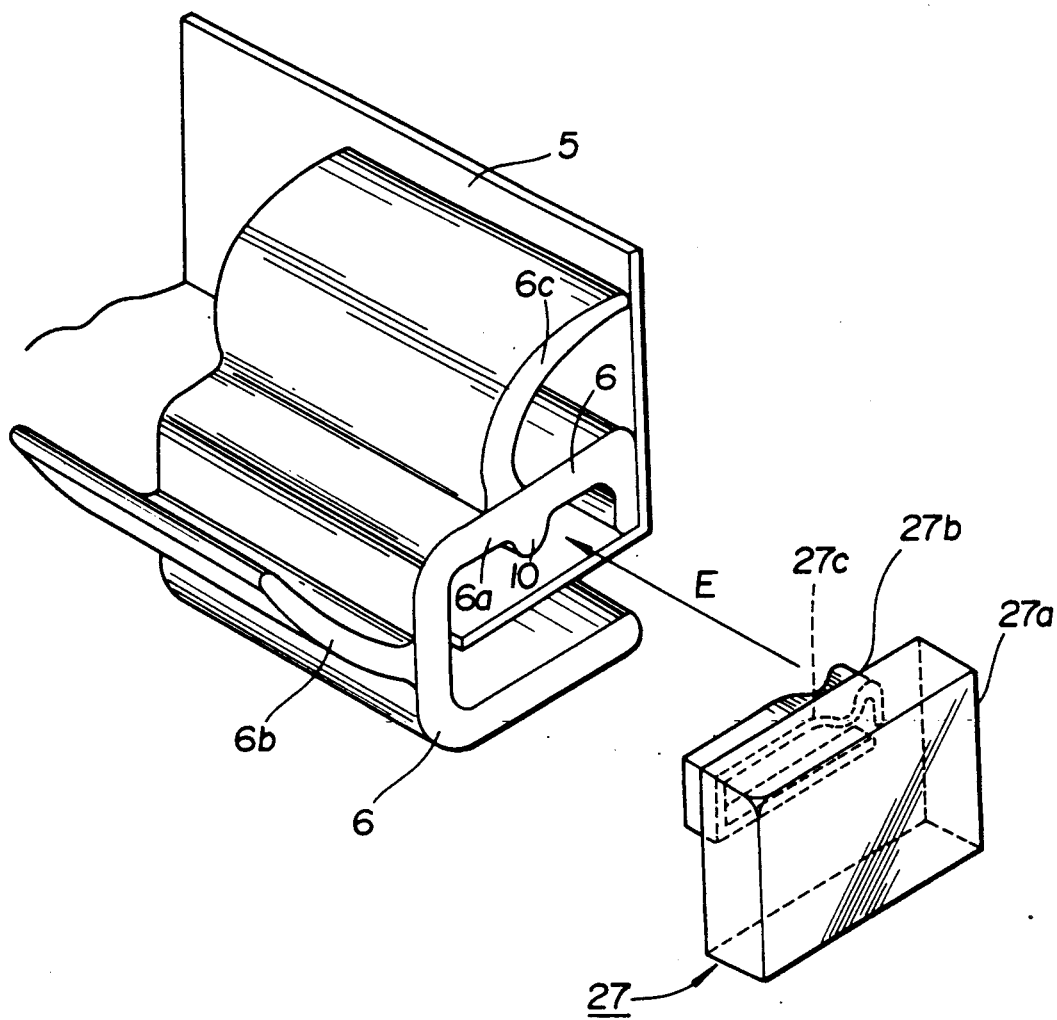

Referring to FIG. 8, a fifth embodiment is shown. A weatherstrip 6 includes a projecting portion 10 formed on an upper inside wall thereof. An end member 27 includes a head portion 27a and a C-shaped clip portion 27b which projects from the head portion. The clip portion 27b has a recessed section 27c for receiving the inside projecting portion of the weatherstrip 6. It will be appreciated that insertion of the end member 27 into an open end of the weatherstrip 6 in a direction indicated by an arrow E causes the clip portion 27b to tightly hold the drip channel 5 with slightly elastic deformation of the clip portion. Additionally, the head portion 27a seals the open end of the weatherstrip hermetically.

Preferably, the size of the clip portion in the cross section thereof may be greater somewhat than that of the hollow of the weatherstrip so that the clip portion urges the weatherstrip to expand slightly to provide tight engagement therebetween.

Figure 9:
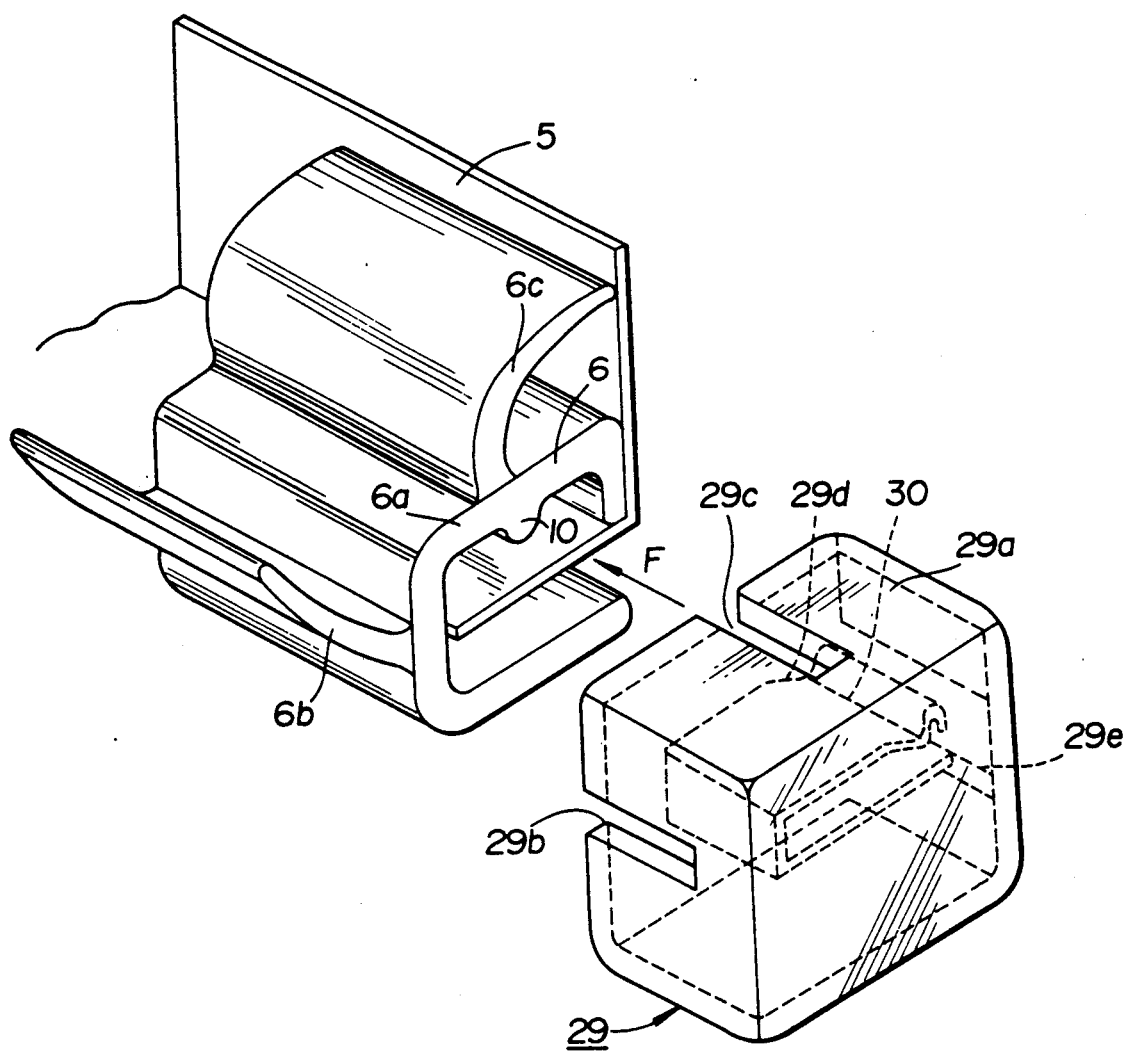
Figure 10:
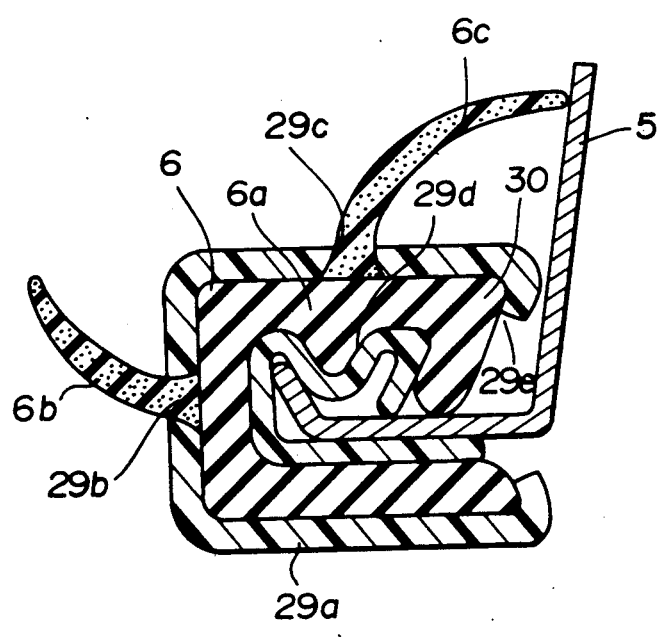
FIG. 10 is a cross-sectional view which shows an end member inserted into an open end of the weatherstrip shown in FIG. 9.

Referring to FIG. 9, a sixth embodiment is shown. An end member 29 takes the form of a cap similar to the first embodiment and includes slits 29b, 29c, and 29e for receiving seal lips 6b and 6c of a weatherstrip 6 and a drip channel 5 and a C-shaped clip portion 30 formed therein. The clip portion 30 has the same configuration as that of the fifth embodiment and a recessed portion 29d for receiving an inner projecting portion 10 of the weatherstrip.

Insertion of the end cap 29 into an open end of the weatherstrip 6 in a direction indicated by an arrow F causes a part of the drip channel covered by the weatherstrip to be inserted into the clip portion 30 and the seal lips 6b and 6c to be inserted into the slits 29b and 29c surrounding and thereby sealing the open end of the weatherstrip.

Therefore, with the above described arrangements, the installation of the end member at the open end of the weatherstrip is a very easy final step in weatherstrip installation and the manufacturing cost is low.

Further, the end member is made of elastically deformable resin material and thus tight engagement between the end member and the weatherstrip or between the end member and the drip channel is provided, preventing the end member from becoming dislodged easily even when stress is concentrated on the end of the weatherstrip.

Although specific embodiments of the invention have been described in detail herein with reference to the accompanying drawings, it will be understood that the invention is not limited to the specifically disclosed embodiments, and that various changes and modifications may be effected therein by one skilled in the art without departing from the scope and spirit of the invention as defined in the appended claims.

What is claimed is:

1. An end member for sealing an open end of a weatherstrip which borders an edge of a vehicular structural component comprising:

a sealing portion for sealing the open end of the weatherstrip; and a fastening portion for elastically holding a portion of the edge of the vehicular structural component which is covered by the weatherstrip to fasten said sealing portion at the open end of the weatherstrip, said fastening portion including a plurality of slits for receiving corresponding seal lips formed on the weatherstrip.

2. An end member as set forth in claim 1, wherein said sealing portion is in the form of a cap which covers the open end of the weatherstrip to seal it.

3. An end member as set forth in claim 1, wherein said fastening portion includes a plurality of slits for enhancing elastic force to hold the edge of the vehicle.

4. A weatherstrip for bordering an edge of a vehicle opening comprising:
   a hollow strip portion contoured for covering the edge of the vehicle opening; and
   an end member for sealing an open end of said strip portion including,
   a sealing portion for sealing the open end of the weatherstrip, and
   a fastening portion for elastically holding a portion of the edge of the vehicle opening which is covered by the weatherstrip to fasten said sealing portion at the open end of the weatherstrip, said fastening portion including a plurality of slits for receiving corresponding seal lips formed on the weatherstrip.

5. An end member as set forth in claim 4, wherein said sealing portion is in the form of a cap which covers the open end of the weatherstrip to seal it.

6. An end member for sealing an open end of a weatherstrip which borders an edge of a vehicular structural component comprising:
   a sealing portion for sealing the open end of the weatherstrip; and
   a fastening portion for elastically holding a portion of the edge of the vehicular structural component which is covered by the weatherstrip to fasten said sealing portion at the open end of the weatherstrip, wherein said fastening portion is C-shaped in cross-section and includes tapered lips on distal portions thereof for holding the edge of the vehicle, and wherein said fastening portion has a protrusion for engaging with an inner wall of the weatherstrip to prevent the end member from becoming dislodged therefrom.

7. An end member as set forth in claim 6, wherein said sealing portion is a plate member formed on a curved portion of said C-shaped fastening portion for blocking the open end of the weatherstrip.

8. An end member for sealing an open end of a weatherstrip which borders an edge of a vehicular structural component comprising:
   a sealing portion for sealing the open end of the weatherstrip, said sealing portion being in the form of a cap for covering the open end of the weatherstrip; and
   a fastening portion for elastically holding a portion of the edge of the vehicular structural component which is covered by the weatherstrip to fasten said sealing portion at the open end of the weatherstrip, wherein said fastening portion is provided in a hollow of the cap for holding the portion of the edge of the vehicular structural component inserted into the weatherstrip.

9. An end member as set forth in claim 8, wherein said cap includes a slit for receiving a seal lip formed on the weatherstrip.

10. An end member for sealing an open end of a weatherstrip which borders an edge of a vehicular structural component comprising:
   a sealing portion for sealing the open end of the weatherstrip; and
   a fastening portion for elastically holding a portion of the edge of the vehicular structural component which is covered by the weatherstrip to fasten said sealing portion at the open end of the weatherstrip, wherein said fastening portion includes a recessed portion for receiving a protrusion formed on an inner wall of the weatherstrip.

11. An end member for sealing an open end of a weatherstrip which borders an edge of a vehicular structural component comprising:
   a sealing portion for sealing the open end of the weatherstrip, wherein said sealing portion surrounds the open end of the weatherstrip; and
   a fastening portion for elastically holding a portion of the edge of the vehicular structural component which is covered by the weatherstrip to fasten said sealing portion at the open end of the weatherstrip, said fastening portion being insertable into the open end of the weatherstrip to hold the edge of the vehicular structural component and press the inside wall of the weatherstrip against the sealing portion so as to fix the end member to the open end of the weatherstrip.

12. An end member for sealing an open end of a weatherstrip which borders a drip channel installed on a vehicle opening, comprising:
   a sealing portion for sealing the open end of the weatherstrip; and
   a fastening portion for elastically holding a portion of the drip channel of the vehicle which is covered by the weatherstrip in cooperation with said sealing portion to retain the end member at the open end of the weatherstrip, wherein said fastening portion includes a plurality of slits for receiving corresponding seal lips formed on the weatherstrip.

13. A weatherstrip for bordering an edge of a vehicle opening comprising:
   a hollow strip portion contoured for covering the edge of the vehicle opening; and
   an end member for sealing an open end of said strip portion including,
   a sealing portion for sealing the open end of the weatherstrip, and
   a fastening portion for elastically holding a portion of the edge of the vehicle opening which is covered by the weatherstrip to fasten said sealing portion at the open end of the weatherstrip, wherein said fastening portion includes a plurality of slits for enhancing elastic force to hold the edge of the vehicle.

14. A weatherstrip for bordering an edge of a vehicle opening comprising:
   a hollow strip portion contoured for covering the edge of the vehicle opening; and
   an end member for sealing an open end of said strip portion including,
   a sealing portion for sealing the open end of the weatherstrip, and
   a fastening portion for elastically holding a portion of the edge of the vehicle opening which is covered by the weatherstrip to fasten said sealing portion at the open end of the weatherstrip, wherein said fastening portion is C-shaped in cross section and includes tapered lips on distal portions thereof for holding the edge of the vehicle.

15. An end member as set forth in claim 14, wherein said fastening portion has a protrusion for engaging with an inner wall of the weatherstrip to prevent the end member from becoming dislodged therefrom.

16. An end member as set forth in claim 14, wherein said sealing portion is a plate member formed on a curved portion of said C-shaped fastening portion for blocking the open end of the weatherstrip.

17. A weatherstrip for bordering an edge of a vehicle opening comprising:
- a hollow strip portion contoured for covering the edge of the vehicle opening; and
- an end member for sealing an open end of said strip portion including,
  - a sealing portion for sealing the open end of the weatherstrip,
  - a fastening portion for elastically holding a portion of the edge of the vehicle opening which is covered by the weatherstrip to fasten said sealing portion at the open end of the weatherstrip, wherein said sealing portion is in the form of a cap for covering the open end of the weatherstrip, and wherein said fastening portion is provided in a hollow of the cap for holding the portion of the edge of the vehicle inserted into the weatherstrip.

18. An end member as set forth in claim 17, wherein said cap includes a slit for receiving a seal lip formed on the weatherstrip.

19. A weatherstrip for bordering an edge of a vehicle opening comprising:
- a hollow strip portion contoured for covering the edge of the vehicle opening; and
- an end member for sealing an open end of said strip portion including,
  - a sealing portion for sealing the open end of the weatherstrip, and
  - a fastening portion for elastically holding a portion of the edge of the vehicle opening which is covered by the weatherstrip to fasten said sealing portion at the open end of the weatherstrip, wherein said fastening portion includes a recessed portion for receiving a protrusion formed on an inner wall of the weatherstrip.

20. A weatherstrip for bordering an edge of a vehicle opening comprising:
- a hollow strip portion contoured for covering the edge of the vehicle opening; and
- an end member for sealing an open end of said strip portion including,
  - a sealing portion for sealing the open end of the weatherstrip,
  - a fastening portion for elastically holding a portion of the edge of the vehicle opening which is covered by the weatherstrip to fasten said sealing portion at the open end of the weatherstrip, wherein said sealing portion surrounds the open end of the weatherstrip and wherein said fastening portion is insertable into the open end of the weatherstrip to hold the edge of the vehicle and press the inside wall of the weatherstrip against the sealing portion so as to fix the end member to the open end of the weatherstrip.

21. An end member for sealing an open end of an elongated weatherstrip which borders an edge of a vehicular structural component, said weatherstrip having at least one sealing lip extending from the major portion of said weatherstrip for establishing a seal with a vehicular structural component, said end member comprising:
- a sealing portion for sealing the open end of the weatherstrip; and
- a fastening portion for engaging with said open end of said weatherstrip, said fastening portion including at least one slit at an orientation corresponding to the position of said sealing lip for receiving the sealing lip formed on the weatherstrip.

* * * * *